Nov. 10, 1970     D. E. WILKES     3,538,594

METHOD AND APPARATUS FOR IMPROVED WELDING

Filed June 30, 1967     2 Sheets-Sheet 1

INVENTOR.
DAN E. WILKES

BY

ATTORNEYS

Nov. 10, 1970    D. E. WILKES    3,538,594

METHOD AND APPARATUS FOR IMPROVED WELDING

Filed June 30, 1967    2 Sheets-Sheet 2

INVENTOR.
DAN E. WILKES

BY

Head & Johnson

ATTORNEYS

3,538,594
METHOD AND APPARATUS FOR IMPROVED WELDING
Dan E. Wilkes, 423 Wright Bldg.,
Tulsa, Okla. 74103
Filed June 30, 1967, Ser. No. 650,274
Int. Cl. B23k *31/02*
U.S. Cl. 29—494          3 Claims

ABSTRACT OF THE DISCLOSURE

This disclosure relates to a method of welding two metal elements, such as lengths of pipe, along juxtaposed edges, including the steps of subjecting one side of such elements, such as the interior of two abutted pipes to be welded, to a vacuum and concurrently welding the juxtaposed edges at the opposite side. The application of a vacuum at the side opposite that being welded functions to assure the penetration of the weld and to achieve the desired configuration of the finished weld. The disclosure has particular application in welding pipes abutted end to end and provides means of assuring welds having full strength throughout the full 360° periphery of the weld. The invention includes apparatus for use in welding pipelines wherein a vacuum may be applied to the interior of lengths of pipe to be welded during the welding process.

CROSS-REFERENCE

This application is not related to any pending application.

SUMMARY OF THE INVENTION

The primary objective in welding two pieces of metal together is to achieve a weld which is at least equal to and preferably is stronger than the pieces being welded. Only in this way can the full design capacities of the welded elements be retained. This invention will be described, in one exemplification, as it is applicable to the welding of lengths of abutted pipe. In laying pipelines the welding usually is done when the pipe is substantially horizontal. This means that during the welding of the upper portion of abutted lengths of pipe the force of gravity tends to draw the molten weld metal towards the interior of the pipe. On the other hand, during the welding of the lower portion, gravity tends to cause the molten weld metal to flow towards the exterior of the pipe. Thus it is relatively easy for an accomplished welder to secure a good weld in the upper portion of the pipe having the desired strength and other characteristics, but it is extremely difficult, and in some instances impossible, to obtain a weld in the lower portion wherein the weld forms an interior bead within the pipe.

The desired configuration of a completed weld around the full 360° periphery of abutted lengths of pipe requires that a portion of the molten weld metal extends within the interior of the pipe through the full internal circumference. With present methods this desired configuration of finished weld is substantially impossible to obtain. This invention provides methods and devices of accomplishing the desired weld configuration.

It is therefore an objective of this invention to provide an improved method for welding metal elements and particularly an improved method of welding overhead.

DESCRIPTION OF VIEWS

DETAILED DESCRIPTION

Figure 1:
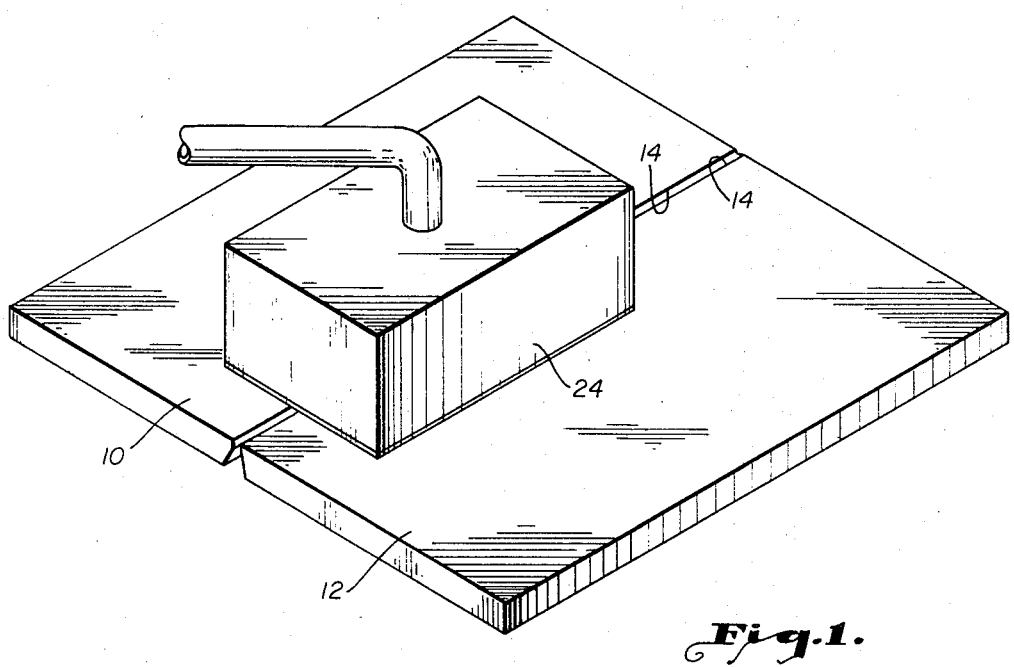
FIG. 1 is an isometric view of two metal members positioned with juxtaposed edges to be welded, including an apparatus according to this invention for applying vacuum to the side of the members opposite the side from which the weld is made to improve the weld configuration.

Referring now to the drawings and first to FIG. 1, first and second metal elements 10 and 12 are shown. Each of the elements 10 and 12 are two sided and each has an edge 14 juxtaposed to an edge of the other member in a position for welding. Each of the edges 14 are shown as having an inclined surface formed for effective welding so that the edges 14, when joined, provide a V-configuration.

Figure 2:
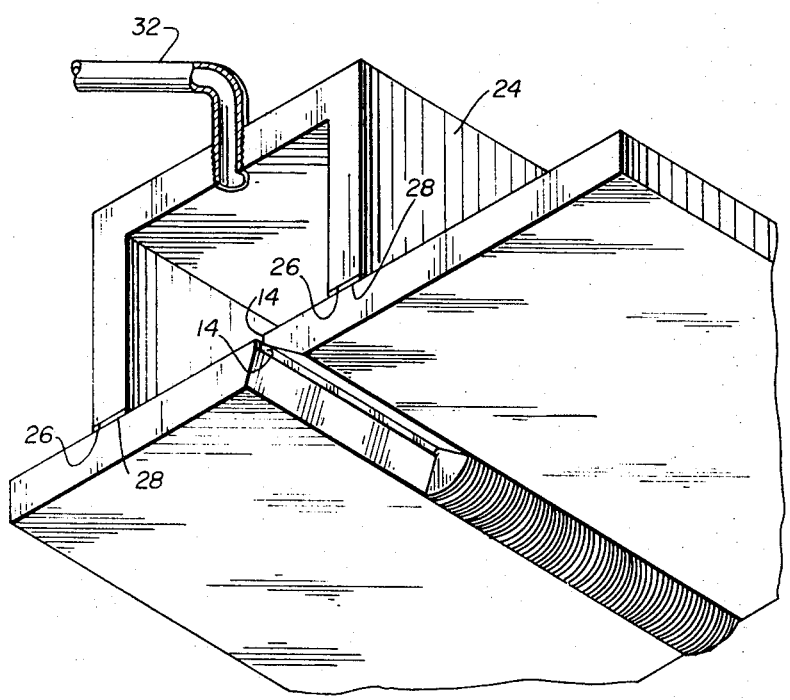
FIG. 2 is an isometric view, shown partially cut away, of two metal elements partially welded and showing a device of this invention used to improve the weld.

While the invention is broadly applicable to welding metal elements in any position, one advantage of the methods of this invention is that of overcoming the effect of gravity on the molten weld metal. Therefore, metal elements 10 and 12 are shown in FIGS. 1 and 2 as being in the horizontal position and configured to be welded from beneath, that is, the welding is done overhead. The force of gravity causes the molten weld metal to tend to flow downwardly and out of the weld seam.

Figure 6:
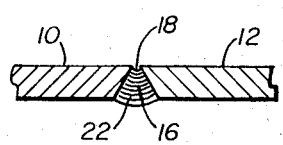
FIG. 6 is a cross-sectional view of two elements welded together showing a representation of the configuration of a defective weld.
Figure 7:
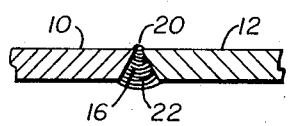
FIG. 7 is a cross-sectional view of two elements showing the desired configuration of the weld which is more easily and consistently obtained by the methods and devices of this invention.

Referring momentarily to FIGS. 6 and 7, an explanation of the purpose of the methods and devices of this invention will be given. FIG. 6 shows elements 10 and 12 in juxtaposed relationship having been welded, the weld forming a bead 16 of solidified molten weld metal. The weld is shown as having been welded overhead, that is, wherein the force of gravity caused the molten weld metal to flow towards the side from which the weld was made. This formed a weld as shown in FIG. 6 wherein the weld bead does not penetrate the full thickness of the elements 10 and 12 and therefore leaves an undercut 18 or concave bead contour. The preferred configuration of a finished weld is shown in FIG. 7 wherein the weld, rather than having an undercut as in FIG. 6, has what may be termed as an interior bead 20. An exterior bead 22 can usually be accomplished without too much difficulty. However, providing the interior bead 20 as shown in FIG. 7, especially when the welding is done in a position so that gravity acts to flow the weld metal towards the welder is extremely difficult to accomplish by even the most skilled welder.

The methods and devices of this invention are directed towards means of accomplishing welds having complete penetration, such as is exemplified in FIG. 7. The methods and devices of this invention are particularly advantageous when the thickness of the elements being welded makes full penetration difficult with present methods and when the weld is made under conditions wherein the force of gravity tends to flow the molten metal away from the weld.

Referring again to FIGS. 1 and 2, an inverted open bottom enclosure member 24 is shown supported on the side of metal elements 10 and 12 opposite that from which the weld is to be applied. The enclosure 24 has an open bottom 26 and along the edge forming opening 26 a resilient seal 28 may be applied. The enclosure 24 has an opening 30 therein from which extends a tubular member 32. The member 32 extends to a vacuum source, such as a vacuum pump or a tank having communication with a vacuum pump. In addition, controls are normally utilized in conjunction with the invention to regulate the application of vacuum, such controls being in the form of valves and other such similar devices which are well known in the art and are not shown.

The method of this invention is practiced in the environment illustrated in FIGS. 1 and 2 by applying a vacuum through the tubular member 32 to the interior of the closure member 24. Vacuum in the enclosure is thereby applied to the side of the metal elements 10 and 12 in the area to be welded, the vacuum being applied to the side opposite that from which welding is to be accomplished. The next step in the welding procedure is to weld the elements 10 and 12 along the edges 14 thereof while vacuum is applied. The molten weld metal formed during the welding process tends to be pulled downwardly out of contact with the edges 14 by the force of gravity. However, by the process of this invention, vacuum applied to the interior of the closure member 24 tends to pull the molten weld metal upwardly or through the seam being welded. By control of the vacuum applied to the enclosure 24 in conjunction with the control of the amount and viscosity of the molten weld metal the welder is able to produce a welded seam having the desired characteristics such as is exemplified in FIG. 7.

It should be kept in mind that the principles of this invention are applicable to welding metal elements in any orientation and in some instances, particularly when welding relatively thick members, the method of this invention may be utilized even in orientations wherein the force of gravity does not constitute a serious problem. The use of the method and devices described herein to overcome the effect of gravity is by way of example only.

One important specific application of the methods and devices of this invention is to that of welding pipe. As previously stated, it is relatively easy for an accomplished welder, or for an automatic welding machine, to achieve successfully welds of the upper portion of abutted horizontal lengths of pipe but relatively difficult to achieve successful welds in the lower portion since the force of gravity tends to pull the molten weld metal towards the exterior of the pipe.

Figure 3:
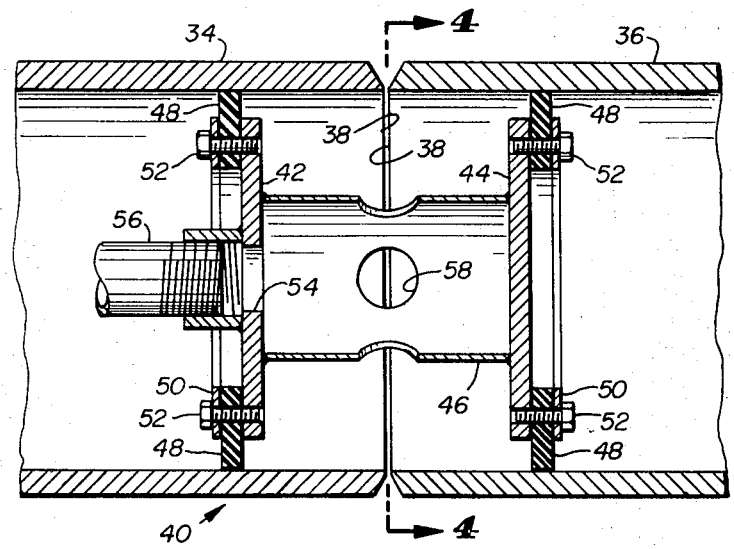
FIG. 3 is a cross-sectional view of two lengths of pipe positioned in abutted end to end relationship to be welded and showing a device of this invention inserted within the pipe whereby a vacuum may be applied during the welding process.

FIG. 3 shows two lengths of pipe 34 and 36 with the ends 38 thereof to be welded shown in abutting relationship, slightly separated as is the practice to facilitate superior welds. Ends 38 are configured to provide, in cross-section, a V-configuration which is an established practice in the industry.

Positioned within the lengths of pipe 34 and 36 is a boundary forming means generally indicated by the numeral 40, which may be described as a vacuum applicator. The applicator 40 includes a first and second cylindrical end plate 42 and 44 in paralleled spaced relationship, supported by means of a concentric frame member 46. Affixed to the periphery of each of the end plates 42 and 44 are circumferential gaskets or seal members 48 which may be held in place such as by means of a retaining ring 50 and bolts 52.

End plate 42 has an opening 54 therein which communicates with a tubular member 56 of smaller diameter than the internal diameter of the lengths of pipe 34 and 36 to be welded. Tubular member 36 extends to the exterior of the length of pipe 34 and affords means of communicating the space between the two end plates 42 and 44 to a vacuum source. The frame member 46 is provided with perforations 58 so that vacuum is communicated between end plates 42 and 44 to the interior of the lengths of pipe to be welded.

Figure 4:
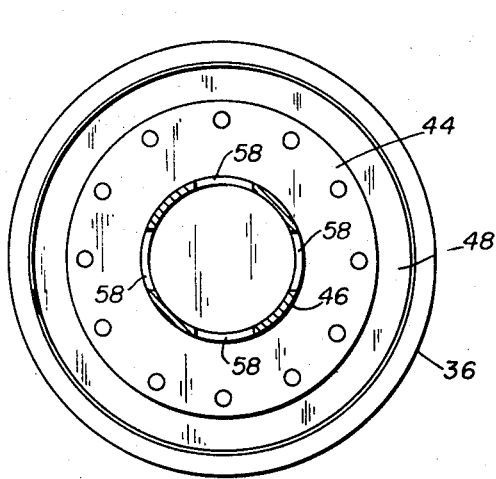
FIG. 4 is a cross-sectional view taken along the line 4—4 of FIG. 3.

The device shown in FIGS. 3 and 4 provides means of applying vacuum to the interior of abutted ends of pipe to be welded. As previously indicated, the upper portion of a circumferential weld of abutted lengths of pipe is normally relatively easy to obtain since the force of gravity cause molten weld metal to tend to flow downwardly towards the interior of the pipe, facilitating the formation of an interior bead. By applying a vacuum to the interior of the pipe, such as by use of the apparatus shown in FIGS. 3 and 4, the force of gravity acting upon the molten weld metal can be overcome by the force of the vacuum tending to pull the molten weld metal within the pipe so that a weld having an interior bead can be obtained around the full circumference of the completed weld.

The methods of this invention may be practiced utilizing apparatus such as shown in FIGS. 3 and 4 in a variety of ways. First, vacuum may be applied throughout the full 360° of the weld and the welder can control the viscosity of the weld through the upper portion so that the combined effect of gravity and vacuum does not draw more of the molten weld metal into the interior of the pipe than is desired. Another arrangement is to weld the upper portion of the abutted lengths of pipe without the application of vacuum and then applying vacuum as the lower portion is welded.

Figure 5:
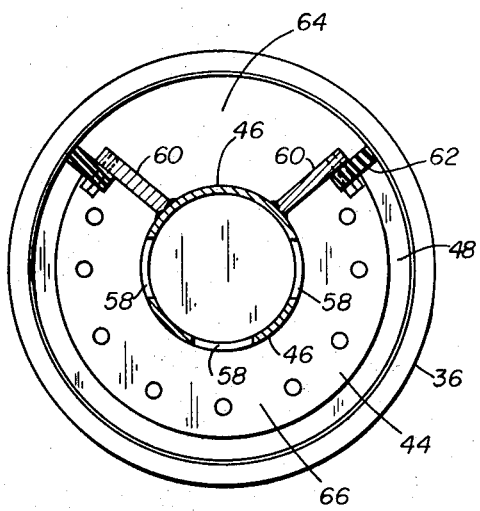
FIG. 5 is a cross-sectional view as shown in FIG. 4 but showing an alternate embodiment of the invention wherein the area of the interior of two abutted lengths of pipe to be welded is divided into an upper and lower zone and wherein a vacuum is applied only to the lower zone.

FIG. 5 shows an alternate embodiment of the device of FIGS. 3 and 4. In this arrangement, horizontal dividers 60 extend between the spaced end plates 42 and 44. Each divider 60 has a gasket member 62 at the outer edge thereof which functions the same as the gasket 48 affixed to the end plates 42. The lower edge of the dividers 62 are affixed to the exterior surface of the cylindrical frame member 46. Each end plate 42 and 44 (only end plate 44 is shown) is segmented, that is less than 360° in circumference. Cylindrical tubular frame member 46 is provided with perforations 58 only in the lower portion thereof. By the arrangement of FIG. 5 the area internally of the abutted lengths of pipe to be welded is divided into an upper area 64 and a lower bound area 66 in an arrangement wherein vacuum is applied only to the lower bound area 66. By this arrangement the upper portion of the pipes 34 and 36 is welded and an internal bead is obtained by the effect of gravity, while the molten weld metal is drawn inwardly throughout the lower portion of the circumferential weld by the effect of applied vacuum in lower bound area 66 to assure a complete and fully effective weld around the full pipe circumference. The relative dimensions of the upper area 64 and the lower bound area 66 may vary considerably; for instance, the dividers 60 may extend horizontally so that the upper and lower bound areas are of equal size and thereby vacuum is applied only to the lower hemispheric portion of the interior of the abutted lengths of pipe to be welded.

It can be seen that the apparatus shown in FIGS. 3, 4 and 5 may be varied in many ways. It is customary to use alignment tools to properly align lengths of pipe during welding. Such alignment tools usually are positioned internally of the pipe. It can be seen that an alignment tool may be adapted for use with or as a part of the apparatus disclosed herein.

While the methods and apparatus of this invention have been described in substantial detail for purposes of exemplification it is understood that the invention is not limited to the abstract nor the summary herein, nor to the exemplified embodiments but is limited only to the subject matter encompassed within the appended claim or claims, including all equivalents to which each step or element thereof is entitled.

What is claimed is:

1. A method of welding together abutted ends of two lengths of pipe comprising the steps of:

inserting a boundary forming means within and straddling said abutted lengths of pipe forming a bound space within said lengths of pipe;

welding the exterior abutting ends of said lengths of pipe; and concurrently subjecting said interior, directly opposite and in communication with said ends of pipe, to a vacuum sufficient to pull molten weld material slightly interiorly of said pipe.

2. A method of welding together abutted ends of two lengths of pipe according to claim 1 wherein said pipes are substantially horizontal and wherein said boundary forming means defines a bound space within said pipe encompassing the lower portion of the interior ends to be welded.

3. A method of welding together abutted ends of two lengths of substantially horizontal pipe comprising the steps of:

welding the upper portion of the abutted ends exterior of the pipe;

subjecting the interior of each length of pipe in the area of the ends thereof to be welded to a vacuum; and welding the lower portion of the abutted ends exterior of the pipe while maintaining said vacuum.

References Cited

UNITED STATES PATENTS

| | | | |
|---|---|---|---|
| 1,313,542 | 8/1919 | Jones | 285—286 |
| 2,094,495 | 9/1937 | Robinson et al. | 29—503 X |
| 2,787,699 | 4/1957 | Jessen | 285—286 X |
| 1,613,061 | 1/1927 | Smith | 29—494 X |
| 1,738,689 | 12/1929 | Brown et al. | 29—494 X |
| 3,095,844 | 7/1963 | Thielsch | 29—494 |
| 3,241,230 | 3/1966 | Batista et al. | 29—494 |

JOHN F. CAMPBELL, Primary Examiner

R. J. SHORE, Assistant Examiner

U.S. Cl. X.R.

29—503; 269—21; 285—286